United States Patent [19]

Okazaki

[11] Patent Number: 5,175,741
[45] Date of Patent: Dec. 29, 1992

[54] OPTICAL WAVELENGTH CONVERSION METHOD AND LASER-DIODE-PUMPED SOLID-STATE LASER

[75] Inventor: Yoji Okazawa, Kanagawa, Japan
[73] Assignee: Fuji Photo Film Co., Ltd., Kanagawa, Japan
[21] Appl. No.: 534,214
[22] Filed: Jun. 7, 1990

[30] Foreign Application Priority Data

Jun. 7, 1989 [JP] Japan .................... 1-144608
Jun. 7, 1989 [JP] Japan .................... 1-144609

[51] Int. Cl.⁵ ............................................ H01S 3/091
[52] U.S. Cl. ........................................ 372/75; 372/21;
372/69; 372/70; 359/326; 359/328
[58] Field of Search ................ 372/21, 75, 69, 70;
359/326, 328

[56] References Cited

U.S. PATENT DOCUMENTS

| | | | |
|---|---|---|---|
| 4,656,635 | 4/1987 | Baer et al. | 372/21 |
| 4,701,929 | 10/1987 | Baer et al. | 372/71 |
| 4,756,003 | 7/1988 | Baer et al. | 372/75 |
| 4,785,459 | 11/1988 | Baer | 372/75 |
| 4,791,631 | 12/1988 | Baumert et al. | 372/26 |
| 4,837,771 | 6/1989 | Baer | 372/75 |
| 4,872,177 | 10/1989 | Baer et al. | 372/75 |
| 4,894,839 | 1/1990 | Baer | 372/93 |
| 4,908,832 | 3/1990 | Baer | 372/75 |
| 4,909,595 | 3/1990 | Okazak et al. | 359/328 |
| 4,952,013 | 8/1990 | Marada et al. | 350/96.3 |

OTHER PUBLICATIONS

Yao et al. "Calculations of Optimum Phase Match Parameters of the Biaxial Crystal KTP" Japan Applied Physics vol. 55 No. 1 Jan. 1984 pp. 65–68.
Risk et al. "Generation of Blue Light by Intracavity Frequency Mixing of the Laser and Pump Radiation of a Miniature Nd:YAG Laser" Applied Physics Letter vol. 52 No. 2 Jan. 1988 pp. 85–87.
Barzaukas et al. "Quadratic Nonlinear Properties of NPP and of a Newly Engineered Molecular Compound NPAN" Japan Optical Society of America B, vol. 4, No. 6 Jun. 1987 pp. 977–986.
Dixon et al., "Efficient Blue Emission from an Intracavity-Doubled 946 nm Nd:YAG Laser" Optics Letters, vol. 13, No. 2 Feb. 1988, pp. 137–139.

Primary Examiner—Georgia Y. Epps
Attorney, Agent, or Firm—Sughrue, Mion, Zinn, Macpeak & Seas

[57] ABSTRACT

An optical wavelength conversion method employs a bulk-crystal-type optical wavelength converter device of a single crystal of nonlinear optical material known as PRA. Linearly polarized fundamental waves whose wavelengths range from 450 to 4,000 nm are applied to the bulk single crystal, and angle phase matching of the type I is achieved, thereby producing a wave whose frequency is the sum of the frequencies of the applied fundamental waves. A laser-diode-pumped solid-state laser includes a solid-state laser rod doped with a rare-earth material such as neodymium or the like and pumped by a semiconductor laser, and a bulk single crystal of organic nonlinear optical material disposed in a resonator. The bulk single crystal converts the wavelength of a laser beam which is oscillated by the solid-state laser rod and the wavelength of a pumping laser beam into the wavelength of a wave whose frequency is the sum of the frequencies of the laser beams.

6 Claims, 6 Drawing Sheets

OPTICAL WAVELENGTH CONVERSION METHOD AND LASER-DIODE-PUMPED SOLID-STATE LASER

BACKGROUND OF THE INVENTION

1. Field of the Invention

The present invention relates to a method of optically converting, with an optical wavelength converter device, the frequencies of two fundamental waves emitted from respective sources into a frequency which is the sum of the frequencies of the fundamental waves, and a laser-diode-pumped solid-state laser which comprises a solid-state laser rod pumped by a semiconductor laser (laser diode), more particularly, a laser-diode-pumped solid-state laser which includes an optical wavelength converter device, disposed in a resonator, for converting the wavelengths of the frequencies of a laser beam which is oscillated by a solid-state laser rod and another laser beam into a frequency which is the sum of the wavelengths of the laser beams.

2. Description of the Prior Art

There have heretofore been made various attempts to apply two fundamental waves having different wavelengths $\lambda_1$, $\lambda_2$ to a nonlinear optical material to extract a wave having a frequency which is the sum of the frequencies of the fundamental waves, i.e., a wavelength $\lambda_3$ which is expressed by:

$$1/\lambda_3 = 1/\lambda_1 + 1/\lambda_2.$$

One well-known optical wavelength converter device which effects such optical wavelength conversion is a bulk-crystal-type wavelength converter device. Yao et al. describe a method of achieving phase matching at the time of generating a second harmonic wave with KTP which is a biaxial crystal (see Japan Applied Physics Vol. 55, page 65 (1984)).

Nonlinear optical materials which have conventionally been used in bulk-crystal-type optical wavelength converter devices include inorganic materials such as LiNbO$_3$ and KTP, and organic materials such as MNA (2-methyl-4-nitroaniline) disclosed in Japanese Unexamined Patent Publication No. 60(1985)-250334 and NPP (N-(4-nitrophenyl)-L-prolinol), NPAN (N-(4-nitrophenyl)-N-methylaminoaceto-nitrile), etc. disclosed in Japan Optical Society Am. B. The organic optical materials are more advantageous than the inorganic optical materials because they have a higher wavelength conversion efficiency due to a larger nonlinear optical constant, a higher dielectric breakdown voltage threshold, and is less susceptible to optical damage.

The organic optical materials have absorption edges near 450 nm for MNA and 480 nm for NPP. Therefore, they have difficulty in generating sum frequencies in the blue range of the spectrum. On the other hand, the inorganic optical materials such as KTP, LiNbO$_3$, etc. can produce sum frequencies in the blue spectral range since their absorption edges are 400 nm or lower. However, the performance index of these inorganic optical materials for wavelength conversion is smaller than that of the organic optical materials by one figure or more. Similarly, the inorganic optical materials have a low wavelength conversion efficiency due to a low performance index when they are used to produce sum frequencies in longer wavelength ranges such as green and red spectral ranges.

U.S. Pat. No. 4,656,635, for example, shows a laser-diode-pumped solid-state laser in which a solid-state laser rod doped with a rare-earth material such as neodymium is pumped by a semiconductor laser. In order to obtain a laser beam having a shorter wavelength, the laser-diode-pumped solid-state laser includes a bulk single crystal of nonlinear optical material disposed in a resonator for converting the wavelength of a laser beam which is oscillated by the solid-state laser into the wavelength of a second harmonic or the like. It has been proposed to use a bulk single crystal of nonlinear optical material positioned in a resonator to convert the frequencies of a solid-state-laser-oscillated beam and a pumping beam into a sum frequency, as described in Applied Physics Letter Vol. 52, No. 2, 11 Jan. 1988, for example.

Since the conventional laser-diode-pumped solid-state lasers with the wavelength conversion capability employ inorganic nonlinear optical materials such as KTP. LiNbO$_3$, etc.. their wavelength conversion efficiency is low. Specifically, when KTP is used to produce a sum frequency in the blue spectral range, the output of the sum frequency is only as intensive as 100 $\mu$W at present because the performance index of KTP is very low.

With the low wavelength conversion efficiency, the efficiency with which the output energy is utilized is also low. If a highly intensive laser beam having a converted wavelength (i.e.. a shorter wavelength) is desired, then an expensive semiconductor laser of a very high output power of such as 200 mW or more is required as the pumping source. If such a high-output-power semiconductor laser is employed. a large and expensive system for radiating the heat from and hence cooling the semiconductor laser is also needed since a large amount of heat is produced by the semiconductor laser.

The wavelength conversion efficiency may be increased by using a large crystal which provides a long path for the laser beam, as the bulk single crystal of nonlinear optical material. However, it is technically difficult and highly costly to produce such a large crystal.

An increased wavelength conversion efficiency may also be achieved by using a nonlinear optical material having a larger nonlinear optical constant. Inorganic optical materials having nonlinear optical constants which are larger than that of KTP include LiNbO$_3$, BNNB, and KNbO$_3$ which is disclosed in Optics Letters. Vol. 13, page 137 (1988). for example. These inorganic nonlinear optical materials, however, fail to provide a stable wavelength conversion efficiency over a wide temperature range because the phase matching angle of these materials tends to shift due to a temperature change.

If the efficiency with which the solid-state laser is oscillated by the semiconductor laser is high, then the intensity of the solid-state-laser-oscillated laser beam that is applied to the nonlinear optical material becomes high, resulting in a wavelength-converted beam of a higher intensity. However, the conventional laser-diode-pumped solid-state laser has generally employed an array laser as the pumping source. Since the spectral line width of the array laser is as large as 10 nm, the efficiency with which the solid-state laser is oscillated is low and the energy utilization efficiency is also low.

There is known a single-transverse-mode, single-longitudinal-mode semiconductor laser as a semiconductor laser having a small spectral line width (which is normally as large as about 0.1 nm). The oscillation efficiency of the solid-state laser can be increased by controlling the temperature of the single-transverse-mode, single-longitudinal-mode semiconductor laser with a Peltier device so that the oscillation wavelength of the laser will match the absorption peak value of the solid-state laser. However, the presently available single-transverse-mode, single-longitudinal-mode semiconductor laser produces a lower output power than the array laser. To produce a wavelength-converted laser beam of a certain high intensity, the laser beams emitted by a plurality of single-transverse-mode, single-longitudinal-mode semiconductor lasers must be combined into a pumping laser beam. Such a system is costly to manufacture and low in reliability.

SUMMARY OF THE INVENTION

In view of the aforesaid conventional drawbacks, it is an object of the present invention to provide a method of optically converting wavelengths with a high efficiency, the method being capable of producing sum frequencies easily in the blue spectral range.

Another object of the present invention is to provide a laser-diode-pumped solid-state laser which has a high wavelength conversion efficiency, is highly stable with respect to temperature changes, and has a good energy utilization efficiency.

According to the present invention, an optical wavelength conversion method employs a bulk-crystal-type optical wavelength converter device of a single crystal of nonlinear optical material: 3.5-dimethyl-1-(4-nitrophenyl) (hereinafter referred to as "PRA"), which is represented by the following molecular diagram:

Linearly polarized fundamental waves whose wavelengths range from 450 to 4,000 nm are applied to the bulk single crystal. and angle phase matching of the type I is achieved, thereby producing a wave whose frequency is the sum of the frequencies of the applied fundamental waves.

The PRA is disclosed in U.S. patent application No. 263,977, and has a nonlinear optical effect as disclosed in this application. However, it has not been clear how to actually achieve good angle phase matching between fundamental waves and a wave having a sum frequency, employing a bulk-crystal-type optical wave-length converter device of PRA.

Figure 2A:
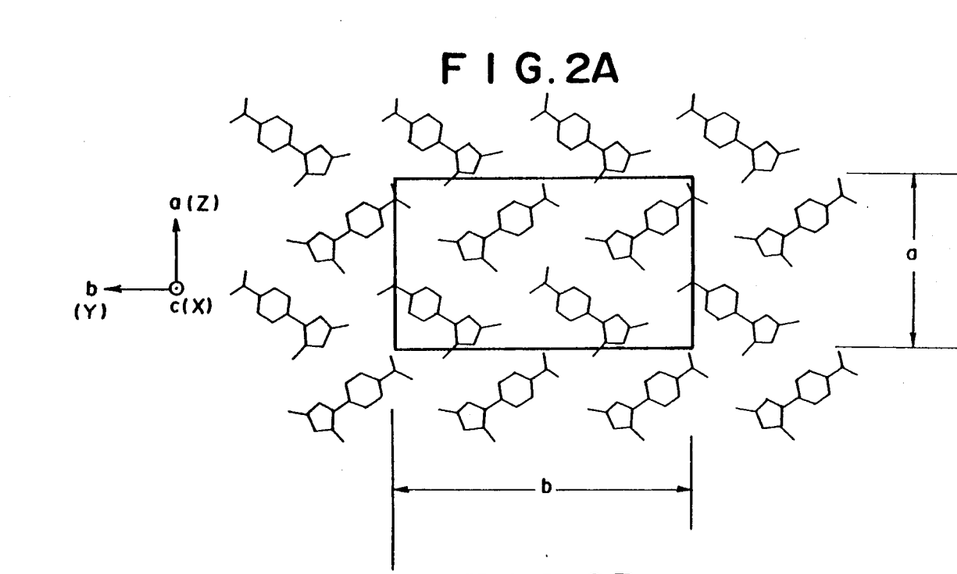
FIGS. 2A, 2B, and 2C are diagrams showing the crystal structures along c-, a-, and b-axes, respectively, of PRA used in the device shown in FIG. 1.
Figure 2B:
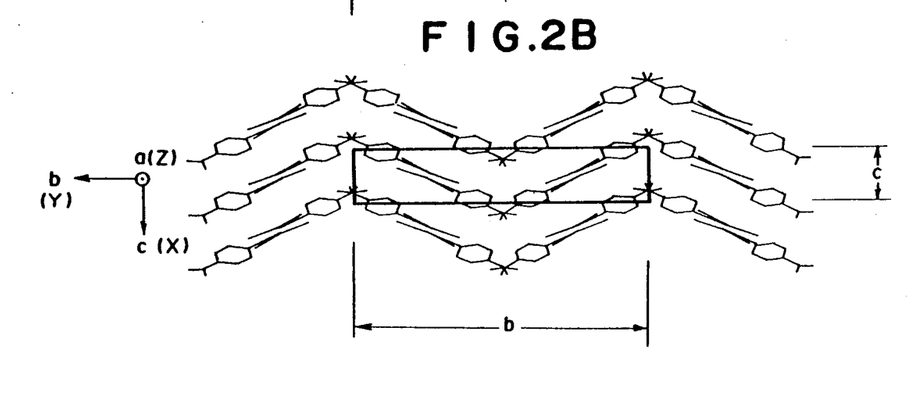
Figure 2C:
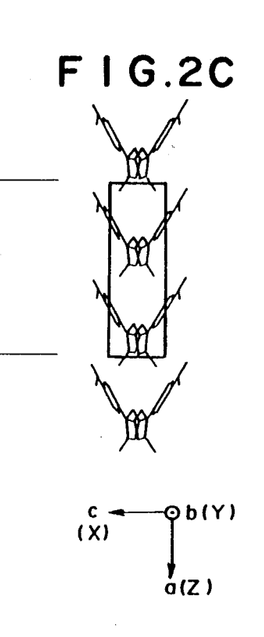

Achievement of angle phase matching of the type I according to the present invention will be described below. A crystalline structure of the PRA is shown in FIGS. 2A, 2B, and 2C. The PRA crystal is of an orthorhombic system, and its point group is mm2. Therefore, the tensor of its nonlinear optical constants is as follows:

$$d = \begin{pmatrix} 0 & 0 & 0 & 0 & d_{15} & 0 \\ 0 & 0 & 0 & d_{24} & 0 & 0 \\ d_{31} & d_{32} & d_{33} & 0 & 0 & 0 \end{pmatrix}$$

Figure 3:
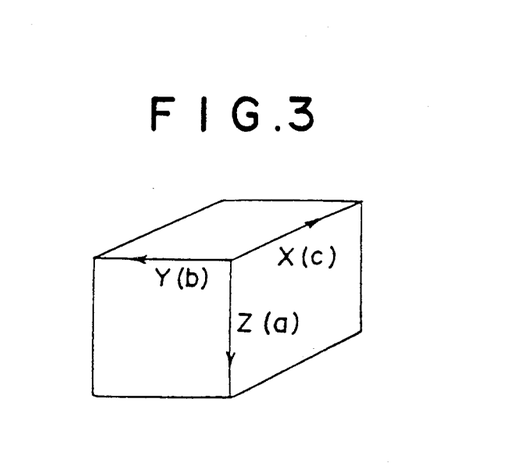
FIG. 3 is a diagram showing the bulk crystal structure of the PRA.

If it is assumed that optical axes X, Y, Z are determined with respect to crystal axes a, b, c as shown in FIG. 3, then $d_{31}$ is a nonlinear optical constant at the time a Z-polarized wave of a sum frequency is extracted when light which is linearly polarized in the direction X (X-polarized light) is applied as a fundamental wave. Similarly, $d_{32}$ is a nonlinear optical constant at the time a Z-polarized wave of a sum frequency is extracted when light which is linearly polarized in the direction Y (Y-polarized light) is applied as a fundamental wave. Likewise, $d_{,,}$ is a nonlinear optical constant at the time a Z-polarized wave of a sum frequency is extracted when light which is linearly polarized in the direction Z (Z-polarized light) is applied as a fundamental wave, $d_{24}$ is a nonlinear optical constant at the time a Y-polarized wave of a sum frequency is extracted when Y- and Z-polarized waves are applied, $d_{15}$ is a nonlinear optical constant at the time an X-polarized wave of a sum frequency is extracted when X- and Z-polarized waves are applied. The magnitudes of the respective nonlinear optical constants are given in the following table:

|  | (1) | (2) |
|---|---|---|
| $b_{31}$ | 26 | — |
| $b_{32}$ | 160 | 240 ± 140 |
| $b_{33}$ | 67 | 70 ± 10 |
| $b_{15}$ | 26 | — |
| $b_{24}$ | 160 | — |

The values in column (1) are obtained from an X-ray crystal structure analysis and the values in column (2) are measured by the Marker Fringe process, both values being given in the unit $[\times 10^{-9} \text{esu}]$.

Performance index comparison indicates that the optical linear constant $d_{32}$ of PRA is 260 times larger than the optical linear constant $d_{31}$ of $LiNbO_3$, and about 100 times larger than an effective nonlinear constant $d_{eff}$ of KTP.

Figure 4:
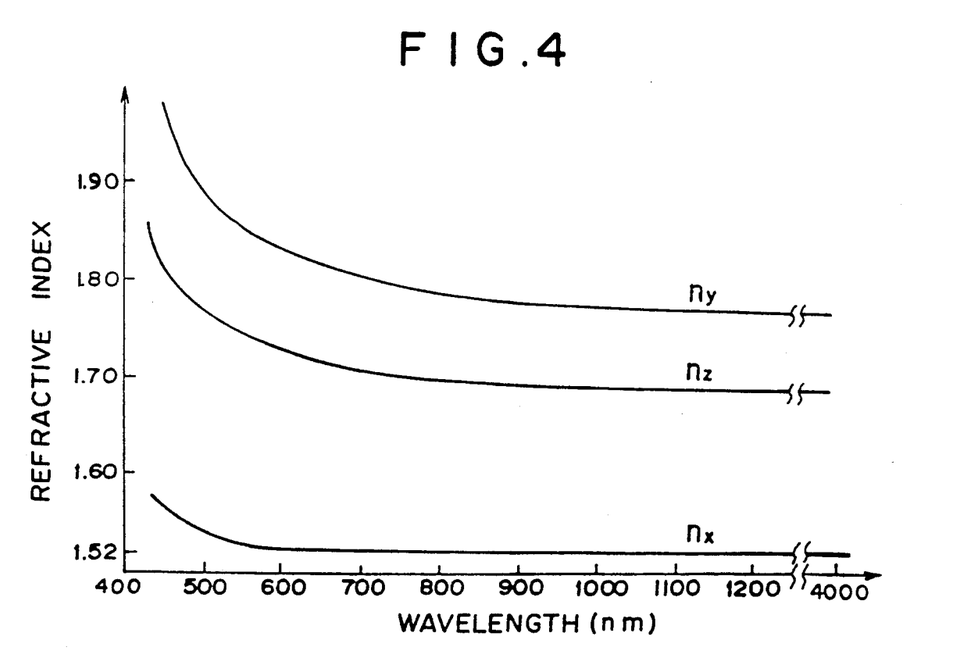
FIG. 4 is a graph showing the wavelength-dependent of the refractive indexes of the PRA.

Since PRA is of an orthorhombic system and also a biaxial crystal, it has a refractive index $n_x$ when the plane of polarization extends along the optical X-axis (i.e., the crystal c-axis), a refractive index $n_y$ when the plane of polarization extends along the optical Y-axis (i.e., the crystal b-axis) normal to the X-axis, and a refractive index $n_z$ when the plane of polarization extends along the optical Z-axis (the crystal a-axis) normal to the X- and Y-axes. The wavelength-dependent dispersion of these refractive indexes $n_x$, $n_y$, $n_z$ is shown in FIG. 4.

If the wavelength of the fundamental wave exceeded 4,000 nm, then it would reach the vibration level of PRA molecules, and the fundamental wave would be absorbed by the PRA molecules. According to the present invention, therefore, the upper limit wavelength value for the fundamental wave is 4,000 nm. Since the PRA absorbs much of light whose wavelength is smaller than 400 nm, the wavelength $\lambda_3$ of the extracted sum-frequency light or wave must be 400 nm or greater. If the lower limit value for the sum-frequency wavelength $\lambda_3$ is 405 nm including a safety margin, then the wavelength $\lambda_1$ of one of the fundamental waves has a maximum value which is equal to the upper limit value $=4,000$ nm, and the wavelength $\lambda_2$ of the other fundamental wave at this time is about 450 nm with the figures below the decimal point being omitted. In order to keep the wavelength $\lambda_3$ of the sum-frequency wave greater than the lower limit value $=450$ nm, if the fundamental wavelength $\lambda_2$ were reduced smaller than 450 nm, then the wavelength $\lambda_1$ of one fundamental would have to be greater than 4,000 nm. According to the present invention, therefore, the lower limit value for the wavelengths of the fundamental waves is selected to be 450 nm.

Figure 5:
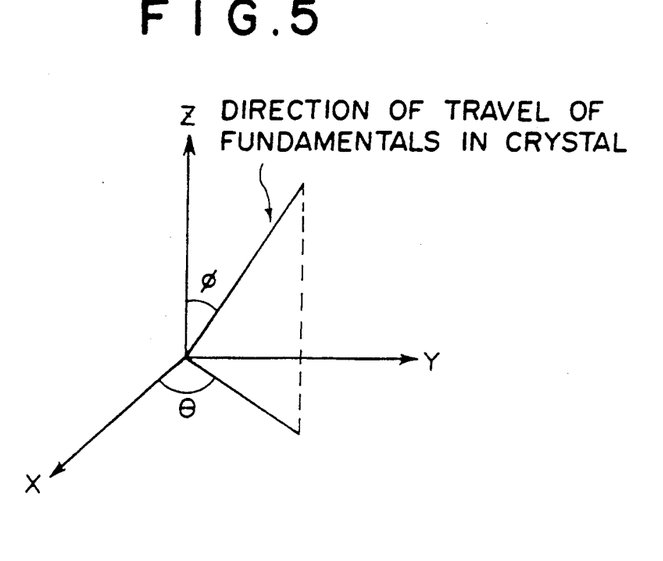
FIG. 5 is a diagram illustrating an angle $\phi$ formed direction in which a fundamental wave travels and an optical Z-axis, and an angle $\theta$ formed between the direction in which a fundamental wave travels and an optical X-axis.

The phase matching process for a biaxial crystal at the time of achieving a second harmonic wave is described in detail in the article written by Yao et al., referred to above. Phase matching for the generation of a sum frequency based on the above article will be described below. It is assumed as shown in FIG. 5 that an angle $\phi$ is formed between the direction in which light travels in a crystal and the optical Z-axis of the crystal and an angle 8 is formed between the optical X-axis and the direction of the light in a plane containing the optical X- and Y-axes, and that the crystal has refractive indexes $n^{\omega 1}$, $n^{\omega 2}$ with respect to respective fundamental waves applied at a desired angle, a refractive index $n^{\omega 3}$ with respect to a sum-frequency wave, and refractive indexes $n^{\omega 1}_x$, $n^{\omega 1}_y$, $n^{\omega 1}_z$, $n^{\omega 2}_x$, $n^{\omega 2}_y$, $n^{\omega 2}_z$, and $n^{\omega 3}_x$, $n^{\omega 3}_y$, $n^{\omega 3}_z$ with respect to the fundamental and the sum-frequency waves along the respective axes. If $$k_x = sin\phi \cdot cos\theta$$

$$k_y = sin\phi \cdot sin\phi$$

$$k_z = cos\phi,$$

then the solutions to the following equations (1-1), (1-2), (1-3) give the phase matching condition:

$$\frac{k_x^2}{(n^{\omega 1})^{-2} - (n_x^{\omega 1})^{-2}} + \frac{k_y^2}{(n^{\omega 1})^{-2} - (n_y^{\omega 1})^{-2}} + \frac{k_z^2}{(n^{\omega 1})^{-2} - (n_z^{\omega 1})^{-2}} = 0 \quad (1\text{-}1)$$

$$\frac{k_x^2}{(n^{\omega 2})^{-2} - (n_x^{\omega 2})^{-2}} + \frac{k_y^2}{(n^{\omega 2})^{-2} - (n_y^{\omega 2})^{-2}} + \frac{k_z^2}{(n^{\omega 2})^{-2} - (n_z^{\omega 2})^{-2}} = 0 \quad (1\text{-}2)$$

$$\frac{k_x^2}{(n^{\omega 3})^{-2} - (n_x^{\omega 3})^{-2}} + \frac{k_y^2}{(n^{\omega 3})^{-2} - (n_y^{\omega 3})^{-2}} + \frac{k_z^2}{(n^{\omega 3})^{-2} - (n_z^{\omega 3})^{-2}} = 0 \quad (1\text{-}3)$$

If
$B_1 = -k_x^2(b_1 + c_1) - k_y^2(a_1 + c_1) - k_z^2(a_1 + b_1)$
$C_1 = k_x^2 b_1 c_1 + k_y^2 a_1 c_1 + k_z^2 a_1 b_1$
$B_2 = -k_x^2(b_2 + c_2) - k_y^2(a_2 + c_2) - k_z^2(a_2 + b_2)$
$C_2 = k_x^2 b_2 c_2 + k_y^2 a_2 c_2 + k_z^2 a_2 b_2$
$B_3 = -k_x^2(b_3 + c_3) - k_y^2(a_3 + c_3) - k_z^2(a_3 + b_3)$
$C_3 = k_x^2 b_3 c_3 + k_y^2 a_3 c_3 + k_z^2 a_3 b_3$
$a_1 = (n_x^{\omega 1})^{-2} \quad a_2 = (n_x^{\omega 2})^{-2}$
$b_1 = (n_y^{\omega 1})^{-2} \quad b_2 = (n_y^{\omega 2})^{-2}$
$c_1 = (n_z^{\omega 1})^{-2} \quad c_2 = (n_z^{\omega 2})^{-2}$,
$a_3 = (n_x^{\omega 3})^{-2}$
$b_3 = (n_y^{\omega 3})^{-2}$ $$c_3 = (n_z^{\omega 3})^{-2}$$

then the solutions to the equations (1-1), (1-2) are given as follows:

$$n^{\omega 1}, i = \frac{\sqrt{2}}{\sqrt{-B_1 \pm \sqrt{B_1^2 - 4C_1}}}$$

$$n^{\omega 2}, i = \frac{\sqrt{2}}{\sqrt{-B_2 \pm \sqrt{B_2^2 - 4C_2}}}$$

$$n^{\omega 3}, i = \frac{\sqrt{2}}{\sqrt{-B_3 \pm \sqrt{B_3^2 - 4C_3}}}$$

(the double sign becomes $+$ when $i=1$, and $-$ when $i=2$)

The phase matching condition of the type I is $$n^{\omega 1}, 2/\lambda_1 + n^{\omega 2}, 2/\lambda_2 = n^{\omega 3}, 1/\lambda_3 \ldots \quad (1\text{-}4)$$

When there exit angles $\phi$, $\theta$ which satisfy the equation (1-4), the phase matching condition of the type I can be achieved. Using the refractive indexes of PRA as shown in FIG. 4, the phase matching angles $\phi$, $\theta$ for the two fundamental waves and the sum-frequency wave, which satisfy the equation (1-4), can be determined.

Figure 6:
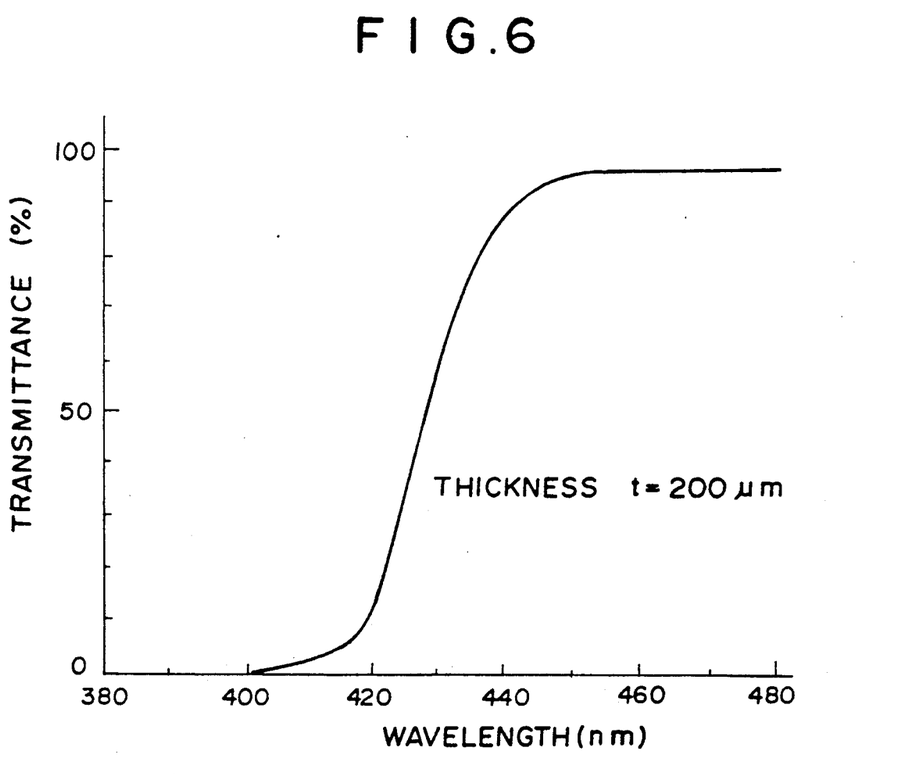
FIG. 6 is a graph showing the transmission spectrum of the PRA.

FIG. 6 shows the transmission spectrum of a thin film of PRA which is 200 $\mu$m thick. As shown in FIG. 6, the PRA does not absorb much of light near the wavelength of 400 nm. Therefore, the optical wavelength converter device which is made of a bulk crystal of PRA can efficiently produce a sum-frequency wave in the blue spectral range.

According to the present invention, a first laser-diode-pumped solid-state laser includes a solid-state laser rod doped with a rare-earth material such as neodymium or the like and pumped by a semiconductor laser and a bulk single crystal of nonlinear optical material which is disposed in a resonator, for converting the wavelength of a laser beam which is oscillated by the solid-state laser rod and the wavelength of a pumping laser beam into the wavelength of a wave whose frequency is the sum of the frequencies of the laser beams, the bulk single crystal comprising a bulk single crystal of organic linear optical material.

According to the present invention, a second laser-diode-pumped solid-state laser includes a solid-state laser rod doped with a rare-earth material such as neodymium or the like and pumped by a semiconductor laser, a laser beam source for generating a laser beam, the laser beam source being separate from the semiconductor laser, and a bulk single crystal of organic nonlinear optical material, which is disposed in the resonator, for converting the wavelength of a laser beam which is oscillated by the solid-state laser rod and the wavelength of the laser beam generated by the laser beam source into the wavelength of a wave whose frequency is the sum of the frequencies of the laser beams.

The organic nonlinear optical material may be MNA (2-methyl-4-nitroaniline) disclosed in Japanese Unexamined Patent Publication No. 60(1985)-250334, NPP (N-

(4-nitrophenyl) -L-prolinol), NPAN (N-(4-nitrophenyl)-N-methylaminoacetonitrile), MAP, m-NA, etc. disclosed in Japan Optical Society Am. B. These organic nonlinear optical materials can provide a high wavelength conversion efficiency since their nonlinear optical constants are very high as compared with inorganic nonlinear optical materials such as $LiNbO_3$ and KTP. The organic nonlinear optical materials are also advantageous in that their dielectric breakdown voltage thresholds are higher and their optical damage is smaller than the inorganic nonlinear optical materials.

The PRA, referred to above, may also be used as the organic nonlinear optical material.

The various organic nonlinear optical materials referred to above, like KTP, have a phase matching angle which shifts or varies only very slightly in response to a temperature change. Since any change in the refractive index of an organic material is a reduction in the refractive index due primarily to a volumetric expansion, the dependency of the birefringence on temperature is near zero, and as a result, any shift of the phase matching angle is almost eliminated.

Preferably, a single-transverse-mode, single-longitudinal-mode semiconductor laser is used as the pumping semiconductor laser of the laser-diode-pumped solid-state laser. Since the wavelength of a laser beam is converted by the organic nonlinear optical material which has a high wavelength conversion efficiency, as described above, a sufficiently intensive wavelength-converted beam can be produced even if the intensity of a laser beam which is oscillated by the solid-state laser rod and is applied as a fundamental wave to the nonlinear optical material is relatively low. Accordingly, a presently available single-transverse-mode, single-longitudinal-mode semiconductor laser, which can produce only a relatively low output power, is sufficiently effective to generate a wavelength-converted beam having a sufficiently high intensity. When the single-transverse-mode, single-longitudinal-mode semiconductor laser which has a small spectral line width is employed, the oscillation efficiency of the solid-state laser rod is increased, and hence the energy utilization efficiency is also increased.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

1st Embodiment

Figure 1:
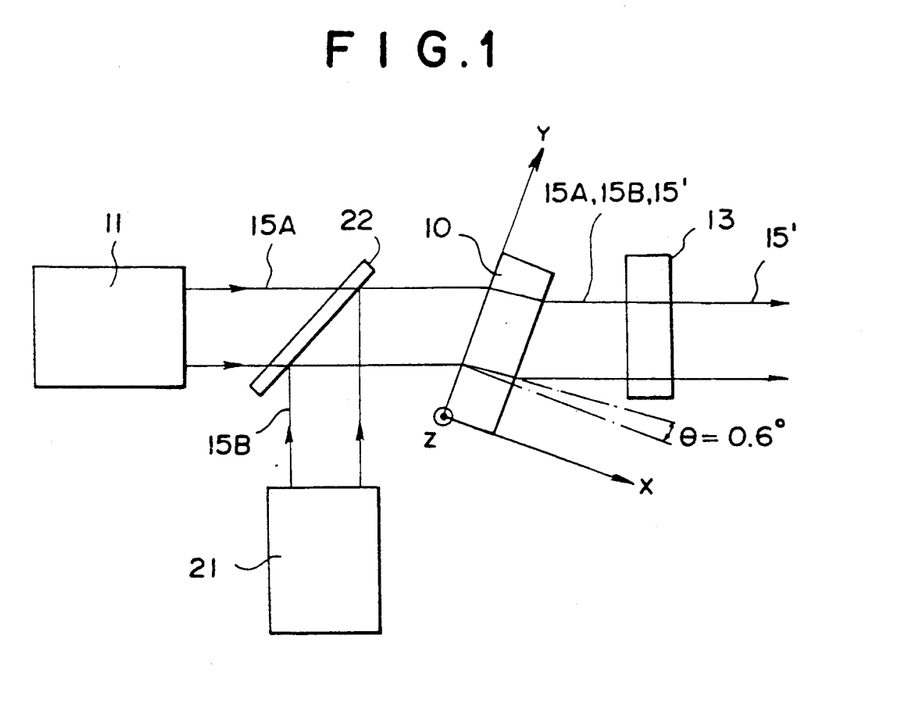
FIG. 1 is a schematic view of an arrangement which an optical wavelength conversion method according to the present invention.

FIG. 1 schematically shows an arrangement for converting the wavelengths of two fundamental waves into the wavelength of a wave whose frequency is the sum of the frequencies of the fundamental waves according to an optical wavelength conversion method of the present invention. The arrangement includes a bulk-single-crystal-type optical wavelength converter device 10. The optical wavelength converter device 10 may be fabricated by the usual Bridgman process. More specifically, PRA in a molten state is poured into a suitable mold and quenched so that the PRA is polycrystallized. Thereafter, the PRA is gradually pulled from the furnace, which is kept at a temperature (e.g., 102.5° C.) higher than the melting point (102° C.) of PRA, into an outer space which is kept at a temperature lower than that melting point, thereby causing the molten PRA to be single-crystallized continuously at the point where it is withdrawn from the furnace. The PRA single crystal thus obtained is of a highly long single crystalline form, 50 mm long or longer, and has a uniform crystal orientation. The optical wavelength converter device 10 is therefore made sufficiently long. Since the wavelength conversion efficiency of an optical wavelength converter device of this type is proportional to the length of the device, as is well known in the art, the longer the optical wavelength converter device, the greater the practical value of the device.

The PRA single crystal is then cut along a Y-Z plane containing the optical Y- and Z-axes (i.e., the crystal b-and a-axes), and cut to a thickness of 2 mm along the X-axis (i.e., the crystal c-axis), thereby producing the optical wavelength converter device 10 of bulk single crystal.

In operation, as shown in FIG. 1, fundamental waves 15A, 15B are generated respectively from a semiconductor laser 11 and a YAG laser 21, the fundamental waves 15A, 15B having respective wavelengths $\lambda_1 = 830$ nm and $\lambda_2 = 1,064$ nm. These fundamental waves or laser beams 15A, 15B are combined by a beam splitter 22 and then applied to the optical wavelength converter device 10 along a direction inclined at $0.6° (= \phi)$ from the X-axis toward the Y-axis in the PRA crystal. In the illustrated embodiment, $\phi = 90°$.

From the wavelength-dependent dispersion of the refractive indexes of the PRA shown in FIG. 4, the refractive indexes $n_x$, $n_y$, $n_z$ of the optical wavelength converter device 10 with respect to light having a wavelength of 830 nm are as follows:

$n_x = 1.5132$
$n_y = 1.7979$
$n_z = 1.6991$

The refractive indexes with respect to light having a wavelength of 1,064 nm are as follows:

$n_x = 1.5077$
$n_y = 1.7806$
$n_z = 1.6890$ when $\theta=0.6°$ and $\theta=90°$, the fundamental wave 15A whose wavelength is $\lambda_1=830$ nm is subjected to an intermediate refractive index between $n_x$ and $n_y$, i.e., $n^\omega = 1.7978$.

The fundamental wave 15B whose wavelength is $\lambda_2=1,064$ nm is also subjected to an intermediate refractive index between $n_x$ and $n_y$, i.e., $n^{\omega 2} = 1.7805$.

The fundamental waves 15A, 15B which have entered the optical wavelength converter device 10 of PRA are converted into a sum-frequency wave 15' whose wavelength is 466 nm. Therefore, the optical wavelength converter device 10 emits a beam which is a mixture of the sum-frequency wave 15' and the fundamental waves 15A, 15B. The emitted beam then passes through a bandpass filter 13, which transmits the sum-frequency wave 15' having the wavelength of 466 nm but absorbs the fundamental wave 15A having the wavelength of 830 nm and the fundamental wave 15B having the wavelength of 1,064 nm. Therefore, only the sum-frequency wave 15' is extracted by the bandpass filter 13. It has been confirmed that the sum-frequency wave 15' is Z-polarized light. Accordingly, the equation (1-4) referred to above is satisfied, and phase matching is achieved between the fundamental waves 15A, 15B and the sum-frequency wave 15'. $d_{32}$, having a higher value is employed as the nonlinear optical constant.

Since the optical wavelength converter device 10 has the following refractive indexes with respect to the light whose wavelength is 466 nm, as can be seen from the wavelength-dependent dispersion of the PRA refractive indexes shown in FIG. 4:

$n_x = 1.5553$
$n_y = 1.9475$
$n_z = 1.7902$ and also since the sum-frequency wave 15 is Z-polarized light, the optical wavelength converter device 10 has a refractive index:

$n^{\omega 3} = n_z = 1.7902$ with respect to the sum-frequency wave 15' whose wavelength is $\lambda_3 = 466$ nm.

The aforesaid values $\lambda_1 = 830$ nm, $\lambda_2 = 1,064$ nm. $\lambda_3 = 466$ nm, $n^{\omega 1} = 1.7978$, $n^{\omega 2} = 1.7805$, and $n^{\omega 3} = 1.7902$ satisfy the phase matching equation (1-4) described above. While the phase matching condition has been described with respect to the angle $\phi = 90°$, there exist other angles $\phi$, $\theta$ which achieve phase matching.

COMPARATIVE EXAMPLE

A bulk single crystal of KTP having a thickness of 2 mm was formed as an optical wavelength converter device similar to the device 10 shown in FIG. 1, and fundamental waves 15A, 15B were applied to the device, thereby generating a sum-frequency wave. The sum-frequency wave 15' produced in 1st Example shown in FIG. 1 and the sum-frequency wave generated in Comparative Example were measured for optical intensity after they passed through the bandpass filter 13. The optical intensity of the sum-frequency wave 15' produced in 1st Example was higher than that of the sum-frequency wave produced in Comparative Example by one figure or more.

2nd Embodiment

A bulk single crystal of PRA is formed as an optical wavelength converter device 10 in the same manner as 1st Example. Laser beams (fundamental waves) having wavelengths $\lambda_1=633$ nm and $\lambda_2=1,550$ nm, produced respectively from an He-Ne laser and a semiconductor laser. are applied to the optical wavelength converter device 10 with the angles being $\theta=2.28°$ and $\theta=90°$.

The refractive indexes $n_x$, $n_y$, $n_z$ of the optical wavelength converter device 10 with respect to light having a wavelength of 633 nm are as follows:

$n_x = 1.5236$
$n_y = 1.8320$
$n_z = 1.7193$

The refractive indexes with respect to light having a wavelength of 1,550 nm are as follows:

$n_x = 1.5012$
$n_y = 1.7604$
$n_z = 1.6773$

When $\theta=2.28°$ and $\theta=90°$, the fundamental wave whose wave-length is $\lambda_1=633$ nm is subjected to an intermediate refractive index between $n_x$ and $n_y$, i.e., $n^{\omega 1} = 1.8314$.

The fundamental wave whose wavelength is $\lambda_2=1.550$ nm is also subjected to an intermediate refractive index between $n_x$ and $n_y$, i.e., $n^{\omega 2} = 1.7599$.

The fundamental waves which have entered the optical wavelength converter device 10 of PRA are converted into a sum-frequency wave whose wavelength is $\lambda_3=449$ nm. The optical wavelength converter device 10 has the following refractive indexes with respect to the light whose wavelength is 449 nm:

$n_x = 1.5632$
$n_y = 1.9792$
$n_z = 1.8107$

Since the sum-frequency wave is Z-polarized light, the optical wavelength converter device 10 has a refractive index:

$n^{\omega 3} = n_z = 1.8107$ with respect to the sum-frequency wave whose wavelength is $\lambda_3 = 449$ nm.

The aforesaid values $\lambda_1$, $\lambda_2$, $\lambda_3$, $n^{\omega 1}$, $n^{\omega 2}$, an $dn^{\omega 3}$ satisfy the phase matching equation (1-4) described above.

3rd Embodiment

A bulk single crystal of PRA is formed as an optical wavelength converter device 10 in the same manner as 1st Example. Laser beams (fundamental waves) having wavelengths $\lambda_1=450$ nm and $\lambda_2=4.000$ nm, produced respectively from a dye laser and an infrared laser, are applied to the optical wavelength converter device 10 with the angles being $\theta=10.56°$ and $\phi=90°$.

The refractive indexes $n_x$, $n_y$, $n_z$ of the optical wavelength converter device 10 with respect to light having a wavelength of 450 nm are as follows:

$n_x = 1.5629$
$n_y = 1.9780$
$n_z = 1.8099$

The refractive indexes with respect to light having a wavelength of 4,000 nm are as follows:

$n_x = 1.4626$
$n_y = 1.6401$
$n_z = 1.6070$

When $\theta=10.56°$ and $\theta=90°$, the fundamental wave whose wave-length is $\lambda_1=450$ nm is subjected to an intermediate refractive index between $n_x$ and $n_y$, i.e., $n^{\omega 1} = 1.9584$.

The fundamental wave whose wavelength is $\lambda_2=4,000$ nm is also subjected to an intermediate refractive index between $n_x$ and $n_y$, i.e., $n^{\omega 2} = 1.6330$.

The fundamental waves which have entered the optical wavelength converter device 10 of PRA are converted into a sum-frequency wave whose wave whose wavelength is $\lambda_3 = 400$ nm. The optical wavelength converter device 10 has the following refractive indexes with respect to the light whose wavelength is 400 nm:
$n_x = 1.6001$
$n_y = 2.1479$
$n_z = 1.9256$
Since the sum-frequency wave is Z-polarized light, the optical wavelength converter device 10 has a refractive index:
$n^{\omega 3} = n_z = 1.9256$
with respect to the sum-frequency wave whose wavelength is $\lambda_x = 400$ nm.

The aforesaid values $\lambda_1$, $\lambda_2$, $\lambda_3$, $n^{\omega 1}$, $n^{\omega 2}$, an $dn^{\omega 3}$ satisfy the phase matching equation (1-4) described above.

4th Embodiment

A bulk single crystal of PRA is formed as an optical wavelength converter device 10 in the same manner as 1st Example. Laser beams (fundamental waves) having wavelengths $\lambda_1 = 830$ nm and $\lambda_2 = 1,500$ nm, produced respectively from semiconductor lasers are applied to the optical wavelength converter device 10 with the angles being $\theta = 19.8°$ and $\phi = 90°$.

The refractive indexes $n_x$, $n_y$, $n_z$ of the optical wavelength converter device 10 with respect to light having a wavelength of 830 nm are as follows:
$n_x = 1.5132$
$n_y = 1.7979$
$n_z = 1.6991$ The refractive indexes with respect to light having a wavelength of 1,500 nm are as follows:
$n_x = 1.5018$
$n_y = 1.7622$
$n_z = 1.67B3$ When $\theta = 19.8°$ and $\theta = 90°$, the fundamental wave whose wavelength is $\lambda_1 = 830$ nm is subjected to an intermediate refractive index between $n_x$ and $n_y$, i.e.,
$n^{\omega 1} = 1.7568$.
The fundamental wave whose wavelength is $\lambda_2 = 1,500$ nm is also subjected to an intermediate refractive index between $n_x$ and $n_y$, i.e.,
$n^{\omega 2} = 1.7253$.

The fundamental waves which have entered the optical wavelength converter device 10 of PRA are converted into a sum-frequency wave whose wavelength is $\lambda_3 = 534$ nm. The optical wavelength converter device 10 has the following refractive indexes with respect to the light whose wavelength is 534 nm:
$n_x = 1.5362$
$n_y = 1.8758$
$n_z = 1.7456$
Since the sum-frequency wave is Z-polarized light, the optical wavelength converter device 10 has a refractive index:
$n^{\omega 3} = n_z = 1.7456$
with respect to the sum-frequency wave whose wavelength is $\lambda_3 = 534$ nm.

The aforesaid values $\lambda_1$, $\lambda_2$, $\lambda_3$, $n^{\omega 1}$, $n^{\omega 2}$, and $n^{\omega 3}$ satisfy the phase matching equation (1-4) described above.

5th Embodiment

A bulk single crystal of PRA is formed as an optical wavelength converter device 10 in the same manner as 1st Example. Laser beams (fundamental waves) having wavelengths $\lambda_1 = 900$ nm and $\lambda_2 = 1,300$ nm, produced respectively from semiconductor lasers are applied to the optical wavelength converter device 10 with the angles being $\theta = 18.88°$ and $\theta = 90°$.

The refractive indexes $n_x$, $n_y$, $n_z$ of the optical wavelength converter device 10 with respect to light having a wavelength of 900 nm are as follows:
$n_x = 1.5111$
$n_y = 1.7914$
$n_z = 1.6954$ The refractive indexes with respect to light having a wavelength of 1,300 nm are as follows:
$n_x = 1.5042$
$n_y = 1.7698$
$n_z = 1.6827$ When $\theta = 18.88°$ and $\theta = 90°$, the fundamental wave whose wavelength is $\lambda_1 = 900$ nm is subjected to an intermediate refractive index between $n_x$ and $n_y$, i.e.,
$n^{\omega 1} = 1.7545$.
The fundamental wave whose wavelength is $\lambda_2 = 1,300$ nm is also subjected to an intermediate refractive index between $n_x$ and $n_y$, i.e.,
$n^{\omega 2} = 1.7352$.

The fundamental waves which have entered the optical wavelength converter device 10 of PRA are converted into a sum-frequency wave whose wavelength is $\lambda_3 = 532$ nm. The optical wavelength converter device 10 has the following refractive indexes with respect to the light whose wavelength is 532 nm:
$n_x = 1.5$
$n_y = 1.8776$
$n_z = 1.7467$
Since the sum-frequency wave is Z-polarized light, the optical wavelength converter device 10 has a refractive index:
$n^{\omega 3} = n_z = 1.7467$
with respect to the sum-frequency wave whose wavelength is $\lambda_3 = 532$ nm.

The aforesaid values $\lambda_1$, $\lambda_2$, $\lambda_3$, $n^{\omega 1}$, $n^{\omega 2}$, and $n^{\omega 3}$ satisfy the phase matching equation (1-4) described above.

6th Embodiment:

A bulk single crystal of PRA is formed as an optical wavelength converter device 10 in the same manner as 1st Example. Laser beams (fundamental waves) having wavelengths $\lambda_1 = 1,200$ nm and $\lambda_2 = 1,300$ nm, produced respectively from semiconductor lasers are applied to the optical wavelength converter device 10 with the angles being $\theta = 18.88°$ and $\theta = 90°$.

The refractive indexes $n_x$, $n_y$, $n_z$ of the optical wavelength converter device 10 with respect to light having a wavelength of 1,200 nm are as follows:
$n_x = 1.5056$
$n_y = 1.7740$
$n_z = 1.6852$ The refractive indexes with respect to light having a wavelength of 1,300 nm are as follows:
$n_x = 1.5042$
$n_y = 1.7698$
$n_z = 1.6827$ When $\theta = 18.88°$ and $\theta = 90°$, the fundamental wave whose wavelength is $\lambda_1 = 1,200$ nm is subjected to an intermediate refractive index between $n_x$ and $n_y$, i.e.,
$n^{\omega 1} = 1.7545$.
The fundamental wave whose wavelength is $\lambda_2 = 1,300$ nm is also subjected to an intermediate refractive index between $n_x$ and $n_y$, i.e., $n^{\omega 2} = 1.7352$.

The fundamental waves which have entered the optical wavelength converter device 10 of PRA are converted into a sum-frequency wave whose wavelength is $\lambda_3 = 624$ nm. The optical wavelength converter device 10 has the following refractive indexes with respect to the light whose wavelength is 624 nm:

$n_x = 1.5244$
$n_y = 1.8347$
$n_z = 1.7209$

Since the sum-frequency wave is Z-polarized light, the optical wavelength converter device 10 has a refractive index:

$n^{\omega 3} = n_z = 1.7209$ with respect to the sum-frequency wave whose wavelength is $\lambda_3 = 624$ nm.

The aforesaid values $\lambda_1$, $\lambda_2$, $\lambda_3$, $n^{\omega 1}$, $n^{\omega 2}$, and $n^{\omega 3}$ satisfy the phase matching equation (1-4) described above.

7th Embodiment:

A bulk single crystal of PRA is formed as an optical wavelength converter device 10 in the same manner as 1st Example. Laser beams (fundamental waves) having wavelengths $\lambda_1 = 1,200$ nm and $\lambda_2 = 1,500$ nm, produced respectively from semiconductor lasers are applied to the optical wavelength converter device 10 with the angles being $\theta = 18.88°$ and $\theta = 90°$.

The refractive indexes $n_x$, $n_y$, $n_z$ of the optical wavelength converter device 10 with respect to light having a wavelength of 1,200 nm are as follows:

$n_x = 1.5056$
$n_y = 1.7740$
$n_z = 1.6852$

The refractive indexes with respect to light having a wavelength of 1,500 nm are as follows:

$n_x = 1.5056$
$n_y = 1.7622$
$n_z = 1.6783$

When $\theta = 18.88°$ and $\theta = 90°$, the fundamental wave whose wavelength is $\lambda_1 = 1,200$ nm is subjected to an intermediate refractive index between $n_x$ and $n_y$, i.e., $n^{\omega 1} = 1.7545$.

The fundamental wave whose wavelength is $\lambda_2 = 1,500$ nm is also subjected to an intermediate refractive index between $n_x$ and $n_y$, i.e., $n^{\omega 2} = 1.7352$.

The fundamental waves which have entered the optical wavelength converter device 10 of PRA are converted into a sum-frequency wave whose wavelength is $\lambda_3 = 667$ nm. The optical wavelength converter device 10 has the following refractive indexes with respect to the light whose wavelength is 667 nm:

$n_x = 1.5209$
$n_y = 1.8232$
$n_z = 1.7140$

Since the sum-frequency wave is Z-polarized light, the optical wavelength converter device 10 has a refractive index:

$n^{\omega 3} = n_z = 1.7140$ with respect to the sum-frequency wave whose wavelength is $\lambda_3 = 667$ nm.

The aforesaid values $\lambda_1$, $\lambda_2$, $\lambda_3$, $n^{\omega 1}$, $n^{\omega 2}$, an $dn^{\omega 3}$ satisfy the phase matching equation (1-4) described above.

While the seven embodiments of the present invention have been described above, the fundamental wavelengths $\lambda_1$, $\lambda_2$ are not limited to the combinations in the above embodiments but may be employed in various other combinations. For example, the angle phase matching of the type I can be achieved by the fundamental wavelengths $\lambda_1$, $\lambda_2$ in the following combinations (the wavelengths $\lambda_3$ of the sum-frequency waves are also given):

| $\lambda_1$ | $\lambda_2$ | $\lambda_3$ |
| --- | --- | --- |
| 4,000 nm | 2,000 nm | 1,333 nm |
| 3,000 nm | 1,000 nm | 750 nm |
| 3,000 nm | 3,100 nm | 1,525 nm |
| 2,000 nm | 2,500 nm | 1,111 nm |
| 1,064 nm | 1,500 nm | 622 nm |

According to the optical wavelength conversion method of the present invention as described above angle phase matching can be achieved between fundamental waves and a sum-frequency wave when the direction of polarization of the fundamental waves to be applied to the PRA crystal is suitably selected. The high nonlinear optical constants which the PRA has can actually be utilized in a bulk-crystal-type nonlinear optical material, so that a very high wavelength conversion efficiency can be realized. Because the PRA has an absorption edge near 400 nm, the optical wavelength conversion method according to the present invention, which employs a bulk single crystal of PRA, makes it possible to extract sum-frequency waves highly efficiently in the blue spectral range.

8th Embodiment

Figure 7:
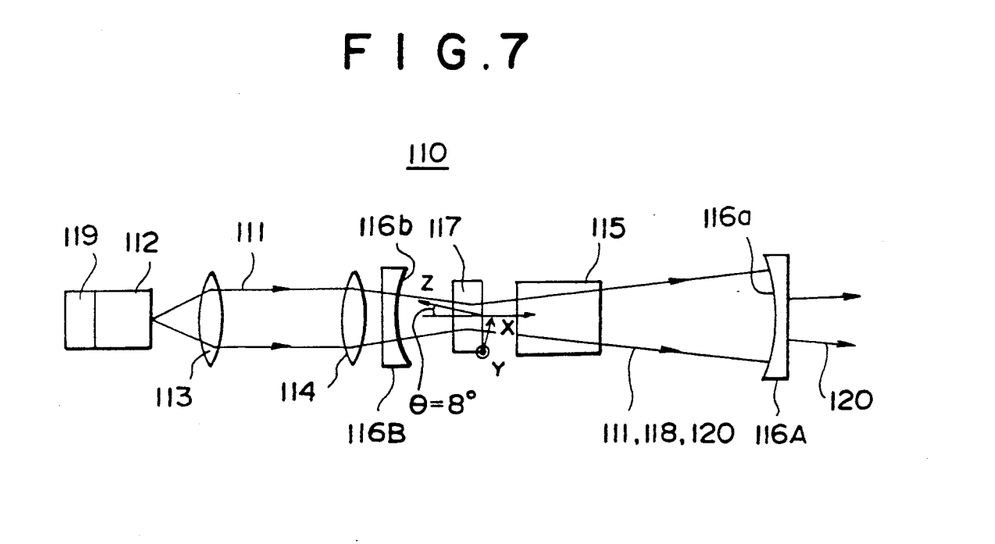
FIG. 7 is a schematic view of a laser-diode-pumped solid-state laser according to the present invention.

FIG. 7 shows a laser-diode-pumped solid-state laser 110 according to an eighth embodiment of the present invention. The laser-diode-pumped solid-state laser 110 comprises a semiconductor laser (phased-array laser) 112 for emitting a laser beam 111 as a pumping beam, a collimator lens 113 for converting the laser beam 111 which is divergent into a parallel laser beam, a condenser lens 114 for focusing the parallel laser beam 111, a YAG rod 115 doped with neodymium (Nd) (hereinafter referred to as an "Nd:YAG rod 115"), two resonators 116 disposed forwardly (rightwardly in FIG. 7) and rearwardly, respectively, of the Nd:YAG rod 115, and an optical wavelength converter device 117 disposed between the resonator 116B and the Nd:YAG rod 115. These elements 112 through 117 are mounted as a unitary assembly in a common casing (not shown). The phased-array laser 112 is kept at a predetermined temperature by a Peltier device 119 and a temperature control circuit (not shown).

The phased-array laser 112 is arranged to emit the laser beam 111 which has a wavelength of $\lambda_1 = 810$ nm. The Nd:YAG rod 115 emits a laser beam 118 having a wavelength of $\lambda_2 = 1,064$ nm when the neodymium atoms are excited by the laser beam 111.

The resonator 116B, serving as an input resonator, has an end surface 116b facing the Nd:YAG rod 115, the end surface 116b being partly spherical. The end surface 116b is coated with a layer which well reflects the laser beam 118 whose wavelength is 1,064 nm, but well transmits the pumping laser beam 111 whose wavelength is 810 nm. The resonator 116A, serving as an output resonator, also has a partly spherical surface 116a which faces the Nd:YAG rod 115 and is also coated with a layer that well reflects the laser beams 111, 118, but well transmits therethrough a sum-frequency wave 120 having a wavelength of 460 nm. The laser beam 118 whose wavelength is 1,064 nm is therefore confined between the surface 116a of the resonator 116A and the surface 116b of the resonator 116B, and causes laser oscillation. The laser beam 118 is applied to the optical wavelength converter device 117. The laser beam 118 and the pumping laser beam 111 which is also applied to the optical wavelength converter device 117 is wavelength-converted into a sum-frequency wave 120 whose wavelength is $\lambda_3 = 460$ nm $(1/\lambda_3 = 1/\lambda_1 + 1/\lambda_2)$.

The optical wavelength converter device 117 will be described in detail below. The optical wavelength converter device 117 is made of a bulk single crystal of PRA. The optical wavelength converter device 117 may be fabricated by the Bridgman process as described above.

In the present embodiment, the PRA single crystal is cut so that two light passage planes lie parallel to each other with a thickness of 5 mm left therebetween, thereby producing the optical wavelength converter device 117 of bulk single crystal.

As shown in FIG. 7, the laser beams 111, 118 are applied to the optical wavelength converter device 117 along a direction parallel to the Z-Y plane of the device 117 so that the laser beams 111, 118 travel along a direction which is inclined at 8° to the Z-axis of the device 117. When the laser beams 111, 118 are thus applied to the optical wavelength converter device 117, phase matching of the type I is achieved between the laser beams 111, 118 and the sum-frequency wave 120. The optical wavelength converter device 117 emits a mixture of the laser beams 111, 118 and the sum-frequency wave 120. The phase matching will be described later on. Since the surface 116a of the resonator 116A is coated with the layer described above, essentially only the sum-frequency wave 120 whose wavelength is $\lambda_3 = 460$ nm is extracted by the resonator 116A.

It has been confirmed that the phase matching condition in the optical wavelength converter device 117 of PRA is sufficiently stable in a temperature range exceeding ±30°. The performance index of PRA is 100 times greater than the performance index of KTP. Therefore, the wavelength conversion efficiency of the optical wavelength converter device 117 is sufficiently high. For example, when the pumping laser beam 111 had an output power of 100 mW, the output power of the sum-frequency wave 120 was about 1 mW.

As described above, PRA which is an organic nonlinear optical material has a high dielectric breakdown voltage threshold and suffers small optical damage. Consequently, it is possible to produce a laser-diode-pumped solid-state laser 110 capable of producing a high-output-power laser beam.

COMPARATIVE EXAMPLE

The optical wavelength converter device 117 shown in FIG. 7 was replaced with an optical converter device made of a bulk crystal of KTP, and the resultant solid-state laser was tested for the generation of a sum-frequency wave. When the pumping laser beam 111 had an output power of 100 mW, the output power of the sum-frequency wave was about 0.1 mW. The output power of about 1 mW of the sum-frequency wave 120 in the Eighth Embodiment is much higher than the output power of about 0.1 mW. This indicates that the optical wavelength converter device 117 according to the present invention has a high wavelength conversion efficiency.

The phase matching between the laser beams 111, 118 and the sum-frequency wave 120 can be achieved when the angles $\phi$, $\theta$ which satisfy the equation (1-4), described above, are present. Using the refractive indexes of PRA shown in FIG. 4, therefore, the phase matching angles $\theta$, $\phi$ with respect to the two fundamental waves and the sum-frequency wave which satisfy the equation (1-4) can be determined.

9th Embodiment

Figure 8:
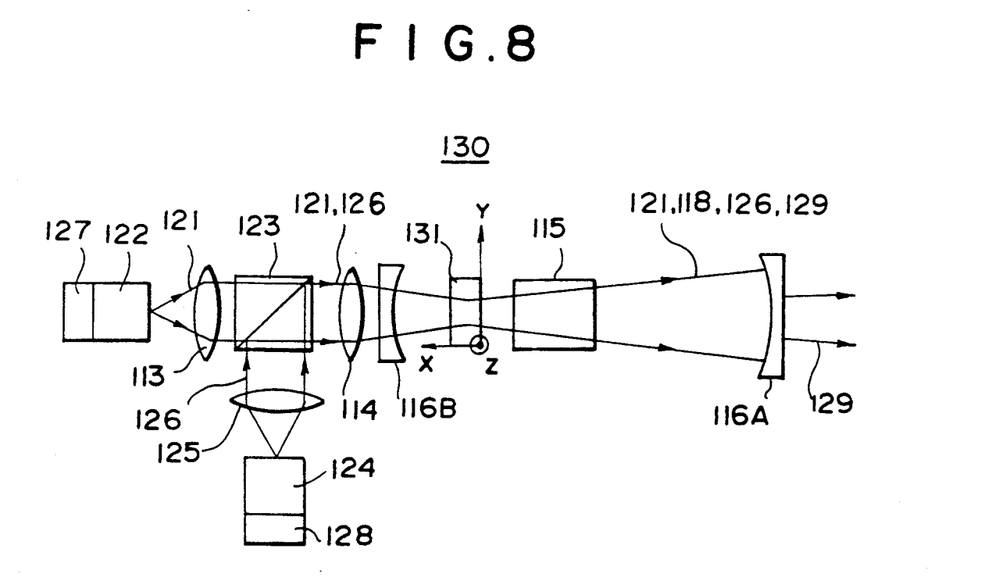
FIG. 8 a schematic view of a laser-diode-pumped solid-state laser according to another embodiment of the present invention.

FIG. 8 illustrates a laser-diode-pumped solid-state laser 130 according to another embodiment of the present invention. Those components shown in FIG. 8 which are identical to those shown in FIG. 7 are denoted by identical reference numerals and will not be described in detail. The laser-diode-pumped solid-state laser 130 includes a single-transverse-mode, single-longitudinal-mode semiconductor laser (single stripe laser) 122 as a pumping source. The single-transverse-mode, single-longitudinal-mode semiconductor laser 122 emits a laser beam 121 having a wavelength of 810 nm. A beam splitter 123 is disposed between the collimator lens 113 and the condenser lens 114. A laser beam 126 having a wavelength of 830 nm is emitted from a semiconductor laser 124 and converted into a parallel laser beam by a collimator lens 125. The parallel laser beam from the collimator lens 125 is applied to the beam splitter 123. The laser beam 126 is combined with the pumping laser beam 121 by the beam splitter 123, and the combined laser beams 121, 126 are then applied to an optical wavelength converter device 131. The single-transverse-mode, single-longitudinal-mode semiconductor laser 122 and the semiconductor laser 124 are kept at predetermined temperatures by respective Peltier devices 127, 128 and temperature control circuits (not shown). For example, the temperature of the single-transverse-mode, single-longitudinal-mode semiconductor laser 122 is controlled with an accuracy error of ±0.1° C., and the temperature of the semiconductor laser 124 is controlled with an accuracy error of ±1° C. The laser beam 121 emitted by the single-transverse mode, single-longitudinal-mode semiconductor laser 122 has a sufficiently small spectral line width of about 1 nm, for example. With the temperature of the single-transverse-mode, single-longitudinal-mode semiconductor laser 122 being controlled as described above, the wavelength of the laser beam emitted thereby can be equalized precisely to the absorption peak wavelength (810 nm) of the Nd:YAG rod 115. In this manner, the oscillation efficiency of the YAG laser which emits the laser beam 118 is increased.

The laser beam 126 whose wavelength is $\lambda_1 = 830$ nm and which is applied to the optical wavelength converter device 131 and the laser beam 118 whose wavelength is $\lambda_2 = 1,064$ nm and which is applied to the optical wavelength converter device 131 are wavelength-converted thereby into a sum-frequency wave 129 which has a wavelength of $\lambda_3 = 466$ nm.

The optical wavelength converter device 131 is made of a single crystal of PRA. Unlike the optical wavelength converter device 117 shown in FIG. 7, the PRA single crystal is cut so that two light passage planes lie parallel to the Y-Z plane with a thickness of 5 mm left therebetween, thereby producing the optical wavelength converter device 131.

The laser beams 126, 118 are applied to the optical wavelength converter device 131 so that the direction of travel of the laser beams 126, 118 in the crystal and the Z-axis form an angle of $\phi=90°$ and the same direction and the X-axis form an angle of $\theta=0°$ in the X-Y plane. When the laser beams 126, 118 are thus applied to the optical wavelength converter device 131, phase matching of the type 1 is achieved between the laser beams 126, 118 as fundamental waves and the sum-frequency wave 129. When each of the laser beams 121, 126 had an output power of 100 mW, the sum-frequency wave 129 having an output power of 30 mW was produced.

In the above embodiments, the optical wavelength converter device is made of a bulk single crystal of PRA. However, the optical wavelength converter device may be made of a bulk single crystal of MNA, NPP, MAP, or the like.

In cases where a single-transverse-mode, single-longitudinal-mode semiconductor laser is employed as a pumping source, it may be a DFB laser, a laser with an external resonator, or the like rather than the single stripe laser 122.

With the present invention, the laser-diode-pumped solid-state laser includes an optical wavelength converter device for converting the wavelength of a solid-state-laser-oscillated beam and the wavelength of another fundamental wave into the waveform of a sum-frequency wave, the optical wavelength converter device being made of a bulk single crystal of organic nonlinear optical material. The optical wavelength converter device has a high wavelength conversion efficiency and produces a highly intensive laser beam of a short wavelength. The optical wavelength converter device is also stable against temperature changes.

Since the wavelength conversion efficiency of the optical wavelength converter device is high, the laser-diode-pumped solid-state laser can emit a highly intensive laser beam of a short wavelength even if it employs, as a pumping source, a single-transverse-mode, single-longitudinal-mode semiconductor laser which has a relatively low output power. If such a single-transverse-mode, single-longitudinal-mode semiconductor laser is used as a pumping source, then the oscillation efficiency of the solid-state laser rod is high, and hence the energy utilization efficiency is also high.

Inasmuch as a sufficiently highly intensive laser beam of a short wavelength can be produced even if a semiconductor laser of a relatively low output power is used as a pumping source, the laser-diode-pumped solid-state laser of the present invention can use a less costly semiconductor laser of a lower output power and can be manufactured more inexpensively than the conventional laser-diode-pumped solid-state laser provided a wavelength-converted beam of the same intensity is to be generated.

Although certain preferred embodiments have been shown and described, it should be understood that many changes and modifications may be made therein without departing from the scope of the appended claims.

I claim:

1. A method of converting the wavelengths of two linearly polarized fundamental waves applied to a bulk single crystal of a nonlinear optical material represented by the following molecular diagram:

into the wavelength of a sum-frequency wave whose frequency is the sum of the frequencies of the fundamental waves, said method comprising the step of:
  i) applying fundamental waves whose wavelengths range from 450 to 4,000 nm to the nonlinear optical material to achieve angle phase matching of the type I, thereby producing a wave whose frequency is the sum of the frequencies of the applied fundamental waves.

2. A laser-diode-pumped solid-state laser comprising:
  i) a solid-state laser rod doped with a rare-earth material;
  ii) a semiconductor laser for emitting a laser beam to pump said solid-state laser rod to oscillate a beam; and
  iii) a resonator including a bulk single crystal of an organic nonlinear optical material for converting the wavelength of the beam which is oscillated by said solid-state laser rod and the wavelength of the laser beam which is emitted by said semiconductor laser into the wavelength of a sum-frequency wave whose frequency is the sum of the frequencies of the oscillated beam and the laser beam, wherein said organic nonlinear optical material is represented by the following formula:

3. A laser-diode-pumped solid-state laser comprising:
  i) a solid-state laser rod doped with a rare-earth material;
  ii) a semiconductor laser for emitting a laser beam to pump said solid-state laser rod to oscillate a beam;
  iii) a laser beam source, separate from said semiconductor laser, for emitting a laser beam; and
  iv) a resonator including a bulk single crystal of an organic nonlinear optical material for converting the wavelength of the beam which is oscillated by said solid-state laser rod and the wavelength of the laser beam which is emitted by said laser beam source into the wavelength of a sum-frequency wave whose frequency is the sum of the frequencies of the oscillated beam and the laser beam, wherein said organic nonlinear optical material is represented by the following formula:

4. A laser-diode-pumped solid-state laser according to claim 2, wherein said solid-state laser rod and said semi-conductor laser produce laser beams having wavelengths ranging from 450 to 4,000 nm, said bulk single crystal being arranged to achieve angle phase matching of the type I for generating said sum-frequency wave.

5. A laser-diode-pumped solid-state laser according to claim 3, wherein said solid-state laser rod and said laser beam source produce laser beams having wavelengths ranging from 450 to 4,000 nm, said bulk single crystal being arranged to achieve angle phase matching of Type I for generating sum-frequency wave.

6. A laser-diode-pumped solid-state laser according to any one of claims 2, 3, 4 and 5 wherein said semiconductor laser comprises a single-transverse-mode, single-longitudinal-mode semiconductor laser.

* * * * *